United States Patent [19]
Stolz

[11] Patent Number: 4,891,905
[45] Date of Patent: Jan. 9, 1990

[54] PLANT RECEPTACLE

[76] Inventor: Thomas O. Stolz, 845 W. Centerville Rd., Dayton, Ohio 45459

[21] Appl. No.: 177,925

[22] Filed: Apr. 5, 1988

[51] Int. Cl.$^4$ .............................................. A01G 9/02
[52] U.S. Cl. ........................................ 47/66; 47/71; 47/40.5
[58] Field of Search ............ 47/1 R, 1 A, 40.5, 66–69, 47/71–79, 81, 39, 40.5; 248/346, 346.1; 446/46

[56] References Cited

U.S. PATENT DOCUMENTS

| | | | |
|---|---|---|---|
| 1,805,649 | 5/1931 | Wermine | 47/40.5 |
| 4,126,963 | 11/1978 | Dunbar | 47/40.5 |
| 4,216,611 | 8/1980 | Psyras | 446/46 |

Primary Examiner—Robert A. Hafer
Assistant Examiner—Lynda M. Cofsky
Attorney, Agent, or Firm—Robert L. Deddens

[57] ABSTRACT

A plant receptacle for storing and displaying plant material, such as a balled plant enclosed in burlap, comprises an inverted cup-like body of polymeric or plastics material having a flexible center portion adapted to change, in response to the weight of a balled plant placed thereon, from a convex shape to a concave shape. An outer circumferential lip or skirt portion depending from the central portion substantially retains its shape, in response to the flexure of the central portion, to provide vertical and lateral support for the central portion, thereby forming a saucer or cavity for capturing and retaining moisture while the balled plant is positioned therein. The central portion forming the saucer is provided with a series of integral and radially spaced barbs for engaging the burlap to stabilize the balled plant in a vertical upright position.

5 Claims, 2 Drawing Sheets

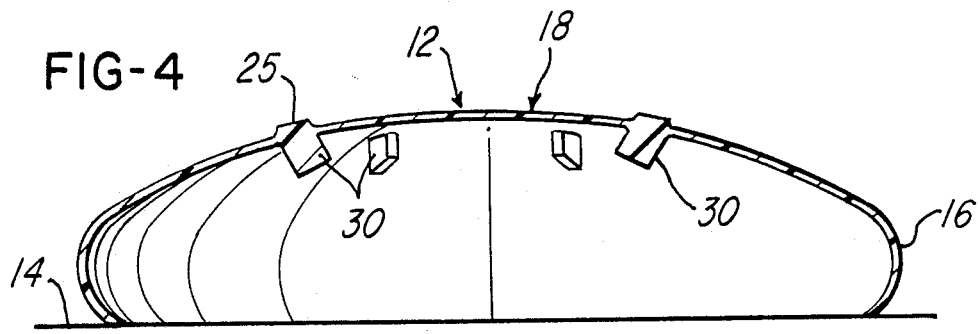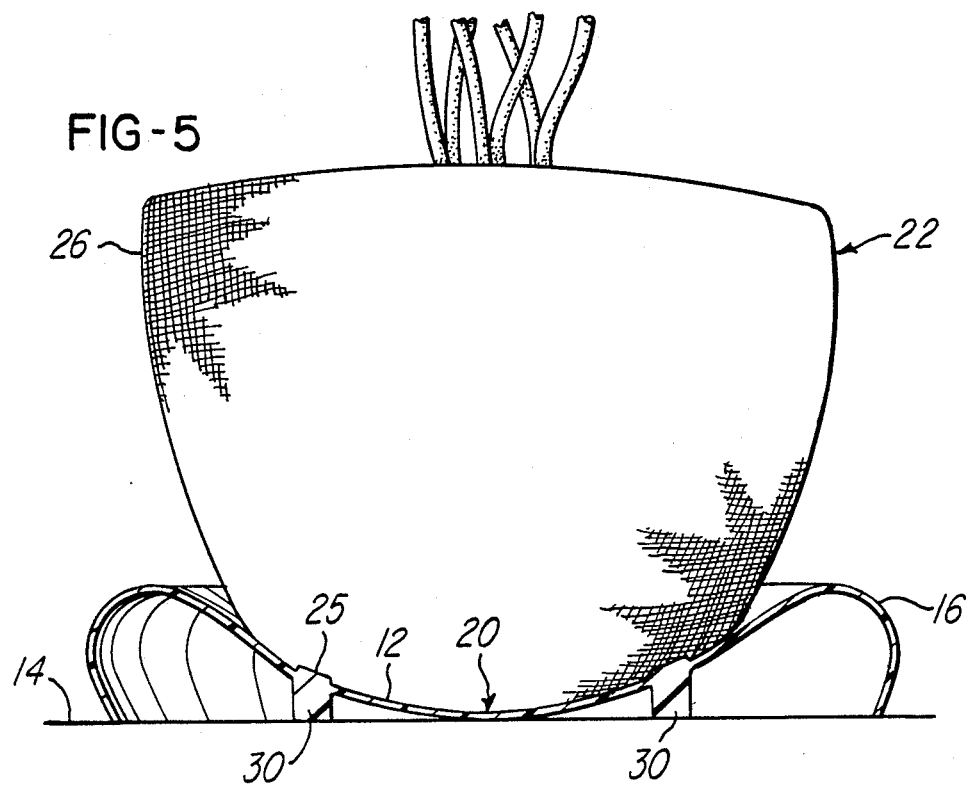

PLANT RECEPTACLE

BACKGROUND OF THE INVENTION

Nurseries and garden stores commonly prepare shrub and tree plant stock for sale by enclosing the root structure and surrounding earth in burlap. The burlap is wrapped around the earth which envelops the roots when the plant is dug from the ground to be prepared for sale. This facilitates movement of the plant from place to place without loss of earth and minimizes disturbance and exposure of the root system. The resulting product is commonly called a "balled and burlaped" plant, or a "B & B" plant.

Newly dug plants which are formed into burlap-covered balls require a healing-in process to minimize root damage. If the roots are not kept moist, the plants will not experience normal recovery from the shock of transplanting. When the roots become dry, the plants are likely to die later, after sold and planted, from their exposed and weakened condition.

In practice, however, the balled plants are often initially placed on a hard surface, for example concrete or gravel, and the nursery or garden center attempts to keep them moist by sprinkling systems. Sellers do not usually keep the balled plants healed-in in earthen holes or protected for display purposes. Placing plants on concrete surfaces does not prevent the plant ball from losing moisture or protect the plant from the natural drying out or desiccation process which occurs when the earthen ball is continuously exposed to the air and to the sun.

Attempts to add moisture to the plant have limited effect, as the water runs off the burlap onto the flat surface below, where it is not retained. Rain is not captured; it runs off. The burlap provides little, if any, insulation. More often than not, the earthen ball becomes hard, impervious to water absorption, and the root system is damaged.

When sellers of plants display the balled plants on concrete or asphalt surfaces, where they are more conveniently surveyed by their customers, the vigor and life of the plant becomes endangered. The flat non-earthen concrete or asphalt surface is hot and has a tendency to cause damage to the root system. Due to the hot surface and the tendency of sprinkling water to run off, the root systems are often damaged to the point that the plant cannot recover after it is planted by a customer. As a result, the nurseryman and garden store owner often suffers losses of plants after the plants are sold by way of guarantee replacement losses.

In addition, when plants are dug from the ground and transplanted and enclosed in burlap, the form of the ball is normally somewhat conical in shape, with the top of the earthen ball having a larger diameter than the bottom of the earthen ball. The bottom of the ball is usually truncated, but round. With the rounded and sometimes irregular surface of the ball, the plants tip or lean over and cannot be displayed properly in an upright position, especially when exposed to a strong windstorm.

In the evolution of the nursery-garden store business, field grown plants have given way to totally pot grown plants. Biologically, field grown plants in soil are often superior to the artificial soil mixes of pot grown plants, except for common, easy to grow plants. Field grown plants are hardier, disease resistant and they are more drought tolerant. To aid the use of natural grown plants instead of artificially and hydroponically grown plants, there is a need for a balled plant receptacle which would facilitate the care and display of the plants grown by natural methods. It would encourage field growing of many species in order to afford a better survival rate over the totally artificially fertilized and artificially grown methods.

An erect, healthy plant, sitting on an attractive receptacle base has a cared-for, superior appearance and consequently is more saleable. In addition, the cost of a balled plant receptacle is much less than a plastic pot for a comparable plant.

SUMMARY OF THE INVENTION

The present invention is directed to a plant receptacle which facilitates the display of a balled plant in an upright position and also captures and retains moisture in the ball for sustenance of the live root system. The invention enables the nurseryman and garden store operator to display balled plants on hot concrete and asphalt surfaces more safely and economically.

Generally, the plant receptacle comprises an inverted cuplike body of plastics material having a generally uniform wall thickness and capable of receiving a balled plant placed upon the upper central convex portion thereof. Upon placement of the plant upon the convex portion of the cup, the central portion of the receptacle flexes and moves from a convex shape to a concave shape to form a cavity. The body includes a peripheral skirt portion depending from the center portion and adapted to rest on a supporting surface. This skirt portion remains relatively rigid and is positioned on the ground to provide vertical and lateral support for the plant located within the concave portion of the receptacle.

Preferably, the body is formed of a molded plastics material of a thickness to provide for convenient flexing of the central convex portion, to form a saucer or cavity under the weight of the balled plant. The convex portion of the body is preferably provided with a series of integral circumferentially spaced barbs protruding upward, and adapted to penetrate into the burlap to anchor the ball and prevent it from tipping relative to the concavity of the saucer. The plastics material is sufficiently flexible to fit the contour of the rounded ball, thereby being adapted to give to the natural variation in the form and size of balls. The outer lip portion is self-supporting as well as ball-supporting. In the preferred embodiment, the plastics material comprises polyethylene.

The resultant plant receptacle enables the balled plant to be displayed in an upright position, with the weight of the ball pressing the saucer against the supporting concrete or asphalt surface. The outer skirt is rigid enough to prevent lateral buckling. The saucer captures rain or other water sources, and enables the water to be absorbed by the ball like a wick. It retains moisture and prevents moisture from being drawn out of the earth ball toward the supporting surface below.

In addition to the advantages referred to above, the above invention protects the living root system, and reduces root damage, plant losses and guarantee losses. And it gives the nurseryman and garden center operator additional options for displaying his products effectively for marketing purposes.

Other advantages and objects of the invention will become apparent from the following descriptions of

DESCRIPTION OF THE DRAWING

FIG. 4. is a section view of another embodiment in its convex form before placement of the ball thereon, and showing downwardly protruding ribs.

FIG. 5. is a section view of the device in FIG. 4 showing a balled plant placed thereon, and showing the downwardly protruding ribs engaging the support surface.

DETAILED DESCRIPTION OF PREFERRED EMBODIMENTS

Figure 1:
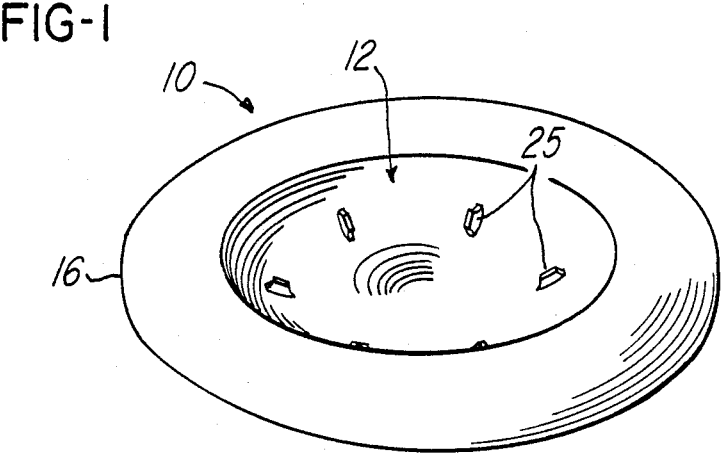
FIG. 1. is a top view of the device in its concave position, showing the protruding barbs for stabilizing the plant ball. The plant ball is not shown.
Figure 2:
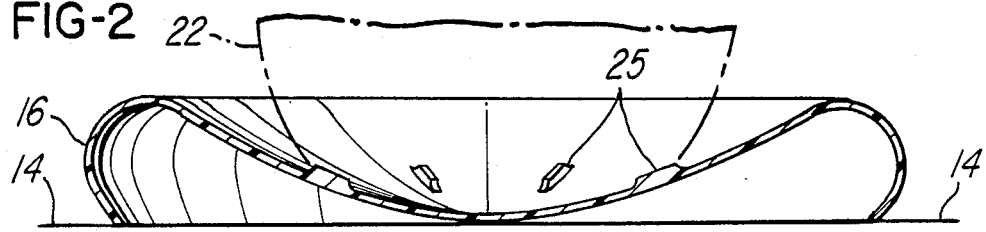
FIG. 2. is section view of the device showing a ball placed thereon with phantom lines.

A plant receptacle 10 generally having an inverted cup-like form (shown in FIG. 4) generally includes a flexible central portion 12 preferably molded with a convex shape relative to the supporting surface 14, and a peripheral lip or skirt portion 16. The plant receptacle 10 is comprised of a molded polymeric or plastics material, preferably polyethylene, impervious to water.

The peripheral skirt portion 16 has a curved cross-sectional configuration and is adapted to rest or be placed upon a supporting surface 14 such as concrete, earth, asphalt, gravel or other flat surface where balled plants may be stored or displayed by a nurseryman or garden center operator. The upper central portion 12 is flexible in order that it will flex and move from a convex shape (shown at 18 in FIG. 4) to a concave shape (shown at 20 in FIG. 3), from the weight of a balled plant 22 placed thereon. This action forms a saucer-like receptacle for the ball of the plant.

In a preferred embodiment, the receptacle 10 is formed with a series of integral barbs 25 projecting upwardly from the body of the central portion 12 and positioned in radially spaced relation. The barbs are adapted to penetrate into the uneven burlap 26 surrounding the ball of earth to anchor the ball and to stabilize it from tipping relative to the concavity of the saucer 20.

The thickness of the walls of the plant receptacle 10 is designed to provide the central portion 12 with flexibility for the bending action under the weight of the ball, and to provide the outer lip portion 16 with sufficient vertical rigidity to provide vertical and lateral support. The outer lip 16 is rigid enough to prevent lateral buckling of the receptacle body 10 under the weight of the ball.

In practice, the walls are molded with a thickness, depending upon the size of the receptacle, to afford the above characteristics. For example.

| Receptacle Diameter | Wall Thickness |
| --- | --- |
| 12" | 1/8" |
| 18" | 3/16" |
| 24" | 1/4" |

To further illustrate, the above sized receptacles would be used for conical plant balls having different upper and lower diameter sizes:

| Receptacle Diameter | Ball Size | |
| --- | --- | --- |
|  | Upper Diameter | Lower Diameter |
| 12" | 12-15" | 8-10" |
| 18" | 15-21" | 10-14" |
| 24" | 21-30" | 14-18" |

Figure 3:
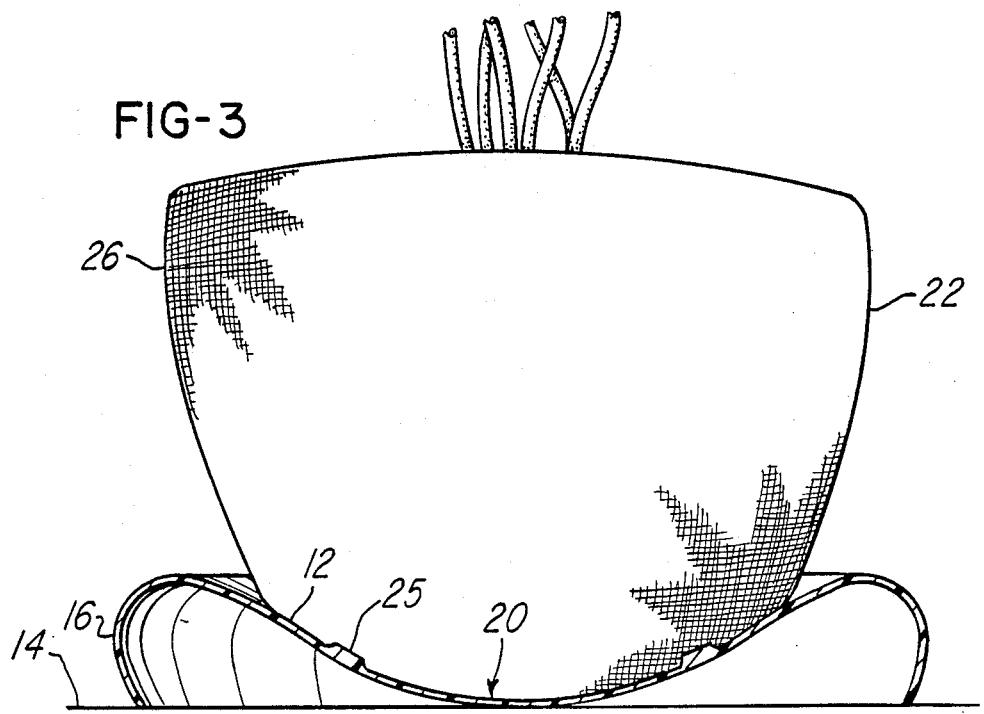
FIG. 3. is a section view of the device showing a balled plant placed thereon.

As can be seen from the drawings, and in particular FIGS. 1, 3 and 4, the weight of the ball 22 causes the receptacle 10 to change its form from an essentially inverted cup-like form to a form having the cross-section similar to a parabaloid. This shape gives the receptacle 10 the strength to support the ball and to prevent it from buckling laterally. The receptacle is sufficiently thin in thickness as to have an even rate of change in shape to accommodate the natural variation in ball forms and sizes. In other words, the cross-sectional profile of the receptacle 10 will change in response to flexure of the member caused by the weight and shape of the ball 22.

In the preferred embodiment, there are six circumferentially spaced integral barbs 25 spaced equidistant from each other and from the center of the central portion 12. The receptacle is preferably formed with six barbs similarly spaced and positioned on the central portion (See FIG. 1). The object of the number and spacing of the barbs is to provide a sufficient number of barbs in generally radially spaced relation and of sufficient height to prevent the ball from tipping in any radial direction.

The barbs 25 adapt to engage the burlap of the ball which is often thick and uneven. The barbs 25 adapt to uneven ball shapes, anchor the ball to the saucer, and fit the general contour of the rounded balls. They are preferably trapezoidal in shape, as shown in the drawings, for integral strength. This form aids in resisting breakage or severance of the barbs 25 from the central portion 23 in the event of rough treatment, but other forms may be used.

The receptacle is preferably designed such that the height of the lip portion 16 will provide for capture of sufficient rain or sprinkling water as to keep the root system moist but not to flood or over-water the plant. In practice, the approximate lip heights for the receptacle size will vary as follows:

| Receptacle Diameter | Approximate Lip Height |
| --- | --- |
| 12" | 3/4" |
| 18" | 1" |
| 24" | 1 1/4" |

With these formations, the saucer will retain sufficient water with infrequent sprinkling to keep the root system moist, by upward absorption, and will cause excess water, which would drown the roots and cause the ball to become loose mud, to run off over the lip.

As will be appreciated from the drawings, the plant receptacle functions in the following manner. When the receptacle is placed on a flat surface 14, with a balled and burlaped plant 22 placed upon it, the central portion 12 responds to the weight of the ball and recedes from the convex shape at 18 (FIG. 4) and becomes a concaved saucer at 20 (FIG. 3). This saucer or concave shape, aided by the protruding barbs 25, maintains the plant ball in a vertical upright position thereby minimizing the tipping action which would be experienced without the receptacle.

The saucer provides a shallow cavity or receptacle for capturing rain and sprinkler irrigation water and thereby enables the water to be retained and absorbed upwardly by the burlap and earth at the bottom of the ball like a wick. In addition, the device provides a moisture barrier preventing moisture from being drawn out of or away from the earth ball toward the supporting surface 14 below the receptacle. It also serves to a degree as a thermal insulation between the earth ball 22 and the supporting surface 14 below.

These functions have improved value to a nursery and garden store operator, because balled plants may be displayed in a wider variety of locations without tipping over. Erect stability of a plant prevent compounding problems by the domino effect—often requiring much labor to straighten groups of plants which have been blown over. Watering needs are reduced because the moisture afforded by rain or sprinkling is retained longer allowing the sprinkling to be less frequent and penetration to the root system of the plant to be more thorough and efficient.

Balled plants may be placed on hot surfaces, such as concrete and asphalt exposed to the sun, with reduced deleterious effect to the root system. The ball itself has improved ability to resist drying out, becoming hardened and impervious to water absorption. The tendency of the ball to become desiccated, through evaporation, is reduced.

This also improves the transplanting recovery period for the root system, because the plant ball may be stored on the receptacle following transplant from earth to burlaped ball. As a result, the healing-in process is bypassed and simplified and plant losses and guarantee losses are minimized, while at the same time affording the retailer additional location options for displaying his products to his customers.

As is apparent from the drawings, the plant receptacle 10 may also be molded in the rigid parabaloid shape (shown in FIG. 3 at 20) rather than the inverted cup-like shape (show in FIG. 4 at 18). In this alternate embodiment, there would be no flexure of the central portion 12 from the convex format 18 (FIG. 4) to the concave form at 20 (FIG. 3).

Another preferred embodiment of the invention (FIGS. 4 and 5) includes a series of circumferentially spaced ribs 30 protruding downwardly from the bottom of the central portion 12. These ribs 30 are spaced to engage the underlying support surface 14 and to prevent the bottom of central portion 12 from bottoming out flat, and to even elevate the central portion 12 slightly above the surface 14 in some cases. This adds additional thermal insulation by permitting air to flow between the central portion 12 and surface 14, thereby reducing heat from being transmitted from the surface 14 to the plant ball 22. It also enables the central portion to retain its concave shape. Preferably, the ribs 30 are located below the barbs 25 to give the receptacle added strength, and are somewhat longer and wider than the barbs 25.

Instead of using the ribs, the receptacle may also be formed, as a rigid member, with a solid integral and circumferential portion depending from the bottom of the central portion 12 and having a generally triangular cross-section and a flat bottom surface for engaging the support surface 14. In this form, the solid portion would depend from a point below the upwardly projecting barbs, downwardly, and be circular in configuration.

While the plant receptacles described herein constitute preferred embodiments of the invention, it is to be understood that the invention is not limited to these precise plant receptacles, and that changes may be made therein without departing from the scope of the invention.

What is claimed is:

1. In combination with a plant having roots confined within a ball of earth, a receptacle for supporting the plant, comprising an inverted generally cup-shaped body of plastics material and having a generally uniform wall thickness, said body including a central portion defining an upwardly concaved cavity, said ball of earth disposed within said cavity, stabilizing means including a series of spaced barbs projecting upwardly from said central portion engaging said ball of earth to stabilize the plant, said body also including a peripheral skirt portion outwardly of said central portion and said ball of earth and projecting downwardly to engage a supporting surface, and said skirt portion having a top surface disposed above and laterally outwardly of said cavity for collecting and retaining rain or sprinkled water in said cavity for absorption by said ball of earth and said central portion being disposed to engage the supporting surface.

2. The plant receptacle as defined in claim 1 wherein said barbs are integrally formed therein.

3. The plant receptacle as defined in claim 1 and including a series of spaced ribs depending downwardly from said central portion and wherein said ribs are located in circumferentially spaced relation for engaging the underlying support surface.

4. The plant receptacle as defined in claim 3 wherein said ribs are formed as integral portions of said body.

5. The plant receptacle as defined in claim 4 wherein said ribs are located immediately below said barbs.

* * * * *